United States Patent [19]

Torkuhl

[11] 4,110,991

[45] Sep. 5, 1978

[54] PREPARING TUBING OR PIPELINES FOR SUBMARINE INSTALLATION

[75] Inventor: Joachim Torkuhl, Korschenbroich-Herrenshof, Fed. Rep. of Germany

[73] Assignee: Mannesmann Aktiengesellschaft, Dusseldorf, Fed. Rep. of Germany

[21] Appl. No.: 757,560

[22] Filed: Jan. 7, 1977

[30] Foreign Application Priority Data

Jan. 9, 1976 [DE] Fed. Rep. of Germany ....... 2600519

[51] Int. Cl.² ............................................. F16L 58/06
[52] U.S. Cl. .................................. 405/157; 405/155; 156/52; 156/294; 264/35; 264/262
[58] Field of Search ................ 61/72.2, 105, 107, 108, 61/106, 72.6; 264/35, 262; 138/108, 146, 175; 156/172, 294, 52

[56] References Cited

U.S. PATENT DOCUMENTS

| | | | |
|---|---|---|---|
| 517,808 | 4/1894 | Ransome | 61/72.2 |
| 1,403,585 | 1/1922 | Bonelli | 264/262 |
| 3,234,741 | 2/1966 | Ionides | 61/7 |
| 3,553,970 | 1/1971 | Wiswell, Jr. | 61/54 |
| 4,011,728 | 3/1977 | Turzillo | 61/50 X |

FOREIGN PATENT DOCUMENTS 1,269,182  7/1961  France ....................... 61/107

*Primary Examiner*—Jacob Shapiro
*Attorney, Agent, or Firm*—Ralf H. Siegemund

[57] ABSTRACT

Pipe sections or tubing is prepared by enveloping in flexible, rather wide hose, and just prior to submarine installation the space between hose and tubing is filled step-wise with wet or dry cement which will set after the tubing has been laid on the sea or lake floor. Anchoring wires with spacers are provided in that space before filling with concrete and the filled hose is armored with ropes or cables to divide the concrete in a quilt-like manner.

5 Claims, 7 Drawing Figures

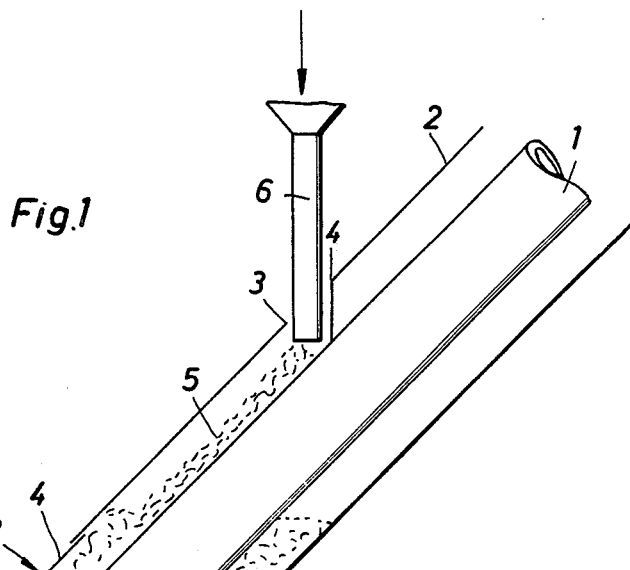
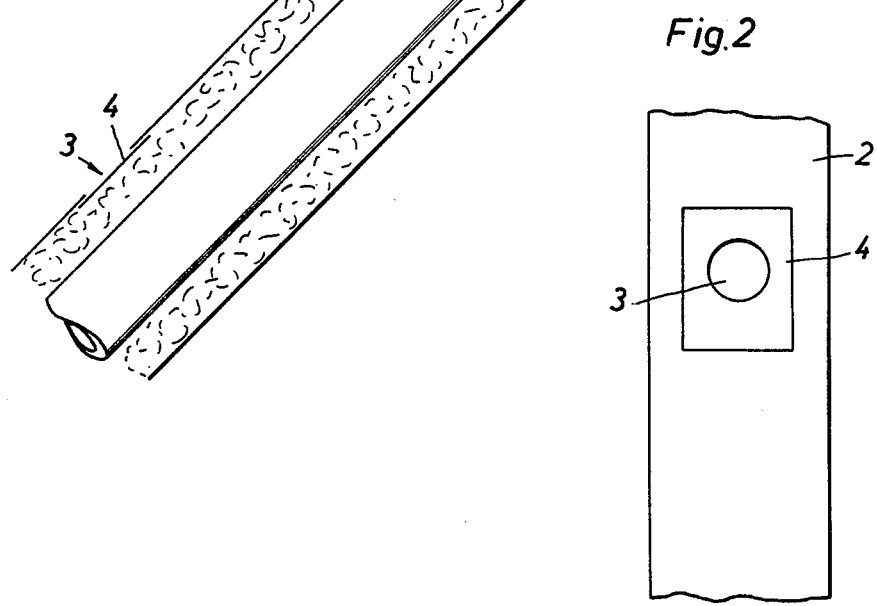

PREPARING TUBING OR PIPELINES FOR SUBMARINE INSTALLATION

BACKGROUND OF THE INVENTION

The present invention relates to the installation of pipe and tube lines on the bottom of the sea, lakes, rivers, etc.

The installation of pipes and tubes under water requires usually that the pipes or tubes be provided with sinkers to counteract buoyancy. Sinkers and weight elements have been used for this purpose made of concrete and having, e.g., bearing block-like configuration. These weighting elements, together with the pipes, are lowered from the vessel to rest on the bottom of the sea, lake, etc. Alternatively, one has used pipes with a rather thick concrete jacket if little elasticity in the pipeline is required. The concrete of the jacket is usually completely set and hardened prior to installation. This particular method has the drawback that the rather heavy pipes have to be handled fairly gentle in order to avoid damage to the concrete. Moreover, significant tension arises in the pipe particularly during installation in great depths; again damage to concrete jacket may readily result therefrom.

DESCRIPTION OF THE INVENTION

It is an object of the present invention to provide a new and improved method for weighting rigid as well as flexible pipe and tube lines using concrete but obviating the drawbacks outlined above.

In accordance with the preferred embodiment of the invention, it is suggested to provide the tube or pipe with a relatively wide flexible hose, and the space between the tube or pipe and the hose is filled with fresh concrete or cement, just prior to lowering the pipe or tube so that the concrete or cement will set only after the pipe or tube has come to rest on the sea or lake or river floor. The concrete or cement must be of the type which does not set too rapidly so that this cladding is not hardened during the installation. As the concrete has not hardened during the installation, it can adapt its contour to the contour of the sea floor on which the pipe or tube is laid. Also, in the case of a flexible tube, the concrete yields to any flexing during handling and installation. Even rigid pipelines undergo tension during installation; but the still soft concrete will not be damaged.

In accordance with further features of the invention, it is suggested to wind wire or cable around the tube or pipes, and spacers keep the wire or cable spaced from the tube or pipe. This preparation step is carried out before filling the hose with concrete. This preparation is preferably carried out before slipping the hose over the pipe or tube. Since the concrete is now primarily held by this particular anchoring, the hose may well be made of biodegradable material. Another feature is to armor the concrete filled assembly with cables or ropes to avoid sagging of the concrete and to establish individual cushions by tensioning the cable or ropes; they have a large pitch and are axially spaced apart. This way the concrete cladding is divided into a quilt-like configuration.

The hose should be made of plastic, mesh fabric or the like. Through impregnation or use of solid plastic, the hose could be made of water impermeable material if the concrete is filled into the hose-tube/space in the wet state. Alternatively, the hose can be made water-permeable, and the concrete or cement is filled into that filling space in the dry state. Setting commences after the assembly has been lowered into the water.

The hose has axially spaced openings which may be closed by shift, flap-like covers. The pipe-hose assembly is passed under the concrete filling station in steps, the openings serving as inlet for the concrete. The inventive method obviates the need of providing the pipelines with individual prepared sinkers and ballast weights.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates somewhat schematically the cladding or jacketing of a tube or pipe in accordance with the preferred embodiment of the present invention;

FIG. 2 is a bottom elevation of a detail of the device shown in FIG. 1;

Proceeding now to the detailed description of the drawings, FIG. 1 shows a pipe 1 made of, e.g. polyethylene, rubber or steel. A covering hose 2 is provided around pipe 1 but at a larger diameter so that a filling space is defined between pipe 1 and hose 2. Hose 2 is made of plastic or a mesh, fabric, cloth, web or the like.

Figure 3:
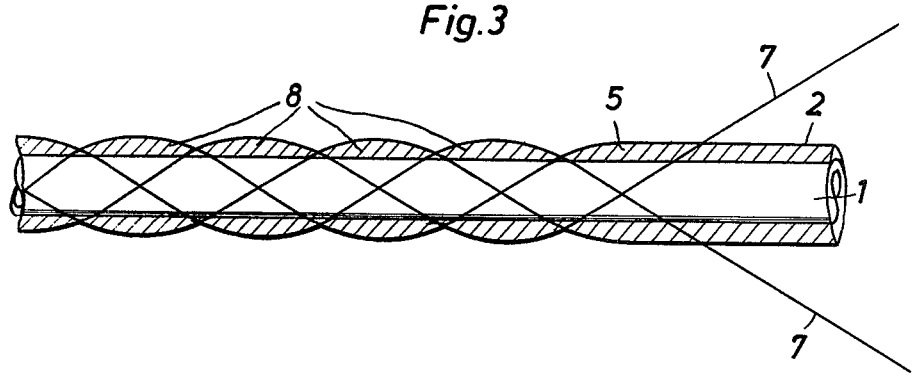
FIG. 3 is a somewhat schematic view of a pipe as it is being armored following the jacketing as per FIG. 1.

Hose 2 is provided with filling openings 3 being arranged in line and regularly spaced along the hose. These openings 3 are normally closed by means of plastic covers or flaps 4 which are rather stiff to avoid bending or bulging. These covers 4 may be hinged on the inside edge or rim of the respective opening, particularly at the upstream edge portion as far as pipe lowering is concerned.

Fresh concrete 5 is poured into the space between pipe 1 and hose 2, whereby one uses an inlet spout or nipple 6 to pour the concrete through one of the openings 3.

Figure 4:
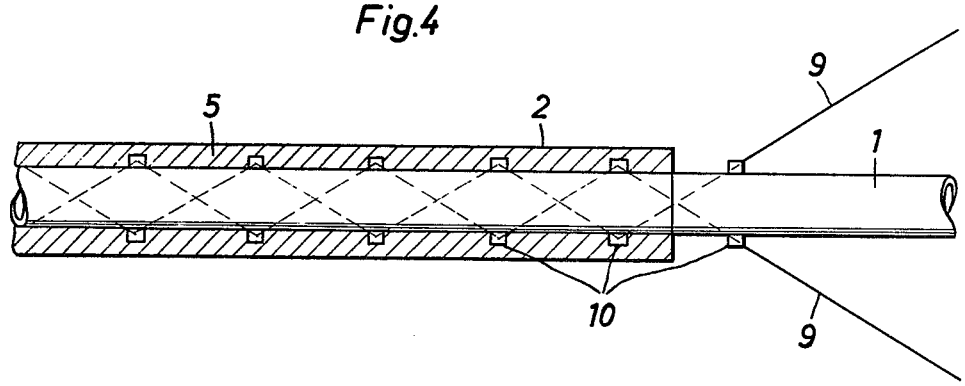
FIG. 4 shows somewhat schematically the armoring step preceding the step as per FIG. 1.
Figure 5:
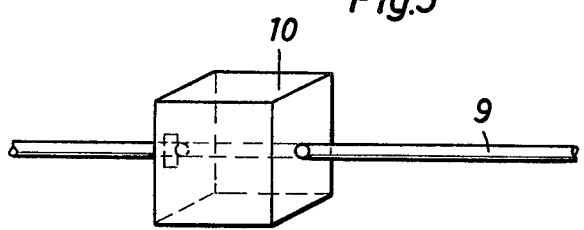
FIG. 5 shows a detail of the armoring wire used in the step explained with reference to FIG. 4.

Turning for a moment to FIGS. 4 and 5, the pipe 1 should be prepared by winding anchoring wires 9 around the pipe or tube at a large pitch and in an intertwining relationship. These wires 9 carry regularly spaced blocks or spacers 10. This arrangement serves to hold the concrete in place. The wires 9 do not touch the pipe because spacers 10 hold them away from the pipe's surface. Therefore, concrete can pour all around the wires 9 providing, therefor, for anchoring and re-enforcement as far as positioning and holding the wet concrete is concerned. Since this anchoring is primarily responsible for holding the concrete, hose 2 can well be made of material that degrades and decomposes under water.

Returning now to FIG. 1, the assembly 1-2 is lowered in steps and a portion thereof has an inclined position for filling. After the level of filled-in concrete has about reached the particular opening 3 through which the concrete is poured, the nipple or spout 6 is slightly retracted, cover 4 may close, and the assembly 1,2 is lowered until the next opening 3 is underneath spout 6. The next charge of concrete 5 actually closes the previously open cover 4 tightly and keeps it closed as it is urged against the rim around the respective opening from the inside.

As the hose/pipe assembly is progressively filled with concrete, the filled portion of that assembly passes through another station being located somewhere underneath the concrete filling station. The assembly may have been veered into the horizontal and is now armored (FIG. 3) in that wires, cables or ropes are wound around the assembly 1,2. If ropes are used, they should be made of non-biodegradable substances, e.g. non-biodegradable plastic. The cables, wires or ropes 7 are wound at a rather large pitch and, e.g., in pairs in that there is a phase difference of half a pitch length. This way, one establishes rhombic concrete cushions 8 in a quilt-like configuration and pattern, having a fixed position on the pipe. The cables, ropes or wires are wound rather taughtly; some coherency in the concrete could be maintained but the wires could be tensioned to squeeze all concrete out from under them. The spacers 10 should be located in or near the center of each cushion.

Figure 6:
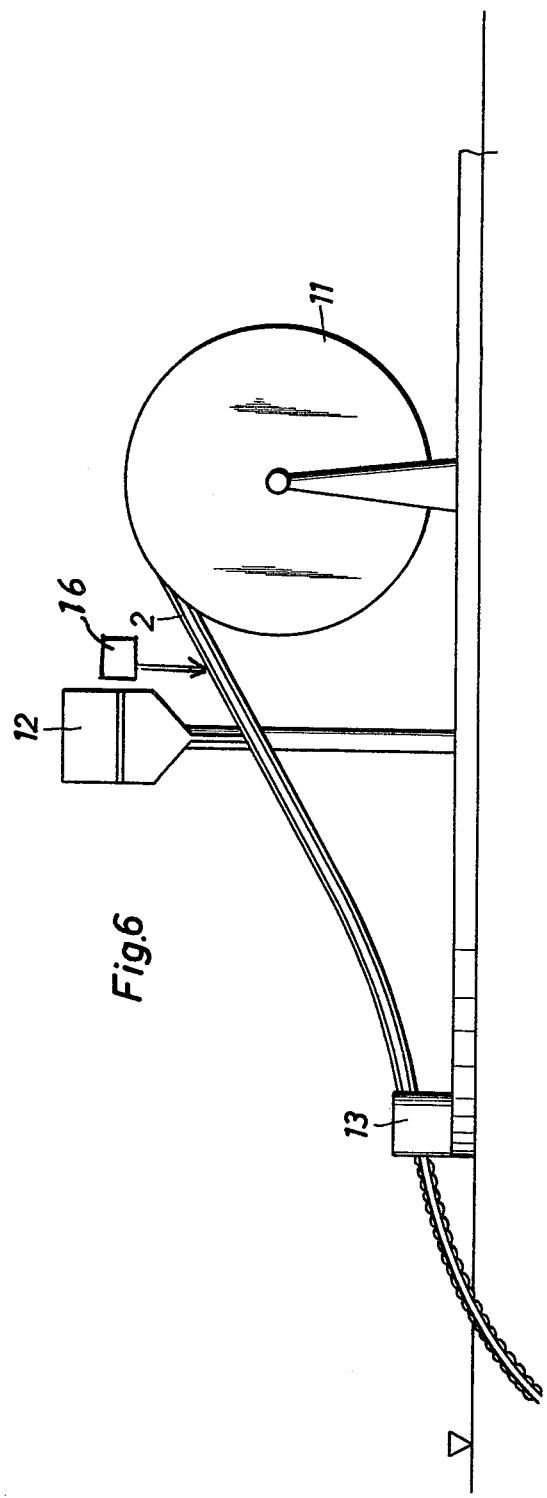
FIG. 6 is a side view of equipment for installing a flexible submarine tube line.

FIG. 6 shows the layout of a complete cladding and jacketing equipment on board of a vessel which installs the pipeline under water. It is specifically presumed that the pipe or tube line is flexible, and may consist of rubber, polyethylene or other flexible material. The pipe 1 with hose 2 is reeled off a storage drum 11 on board of the vessel. The triangle denotes the water level. The assembly 1,2 is unreeled from the drum in steps and is halted whenever the next opening 3 is located under the spout 6. Reference numeral 12 denotes the concrete-filling station having a suitable hopper etc.

Station 16, somewhat ahead of station 12, is provided to blow air into the space between hose 2 and pipe 1, so that the hose be inflated. The hose was pressed flat onto the pipe when reeled onto the drum. This filling with air may take place at a location where the respective next opening 3 is found when concrete is poured into an opening in station 12.

Station 13 is provided for winding the wires, cable or ropes 7 around the filled hose as was explained with reference to FIG. 3. The thus completed assembly is lowered into the sea. The concrete will set during but mostly after such installation. Thus, the assembly as a whole is still flexible during the installation as the pipeline is laid onto the sea floor. The wet concrete can readily adapt to the contour of the floor, and throughout the installation procedure including the flexing and bending of the tube line, the not yet set concrete yields readily, and there is no internal stress, cracking, etc.

The hose 2 should be made of a water impermeable consistency if regular concrete is used, and wet concrete is poured into the filling space. However, one may also use a concrete that sets under water. In this case, dry concrete or cement is used and the hose 2 is made of a water permeable mesh, cloth or fabric. The use of dry concrete facilitates also the distribution of this cladding material around the anchoring wire 9. As soon as the pipe hits the water, water seeps through hose 2 and setting begins. This method permits greater flexibility in the preparation of the concrete and there is no chance of premature setting that may tend to stiffen the pipe.

Figure 7:
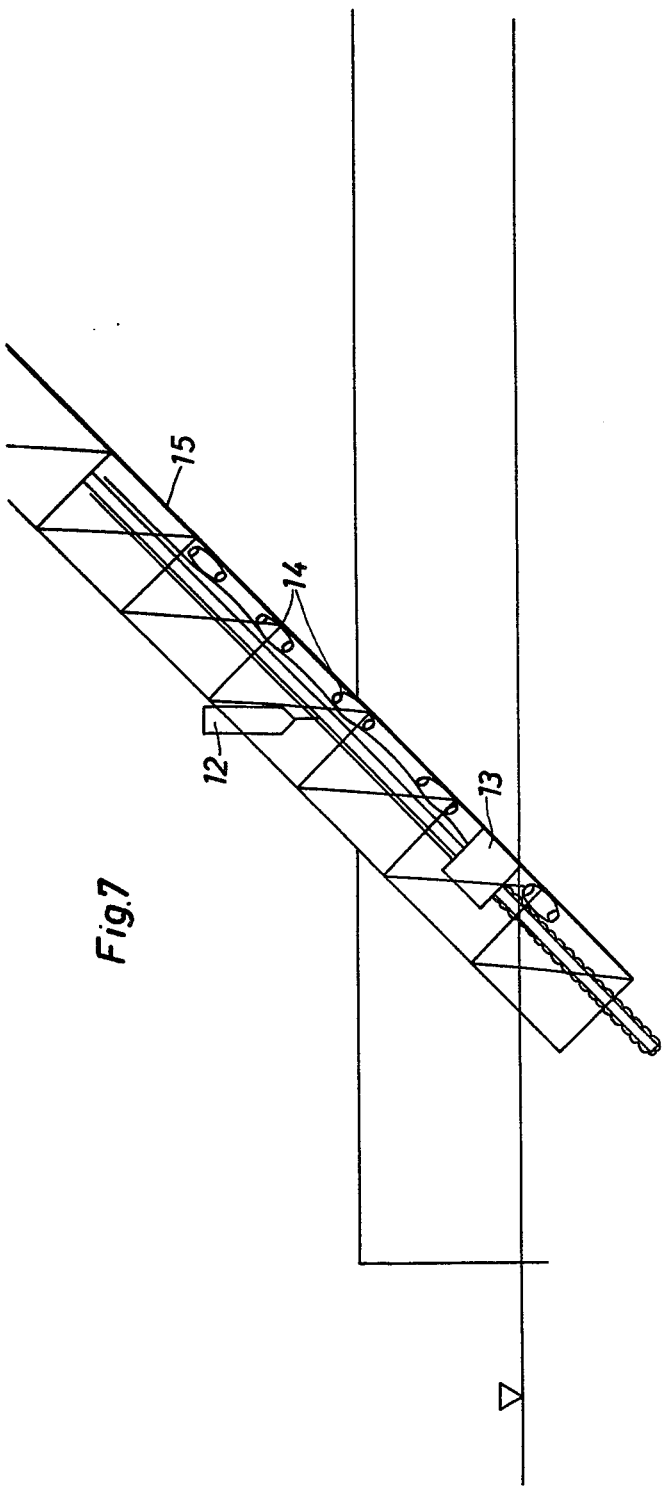
FIG. 7 is a side view of equipment for installing a rigid submarine pipeline.

The method can also be practiced for installing rigid pipelines. The line is to be composed of individual sections which are joined on board of the vessel. As shown in FIG. 7, the vessel has an inclined installation ramp 15 with plural conveyer belts 14 for moving the pipeline down into the water. The individual steel pipe sections are provided also with hoses which may be joined as the pipe sections are joined on the vessel. The space between hoses and pipes is filled analogous to the filling with concrete as described; a filling station 12 being provided accordingly. Also, an armoring station 13 is provided to wind wires around the hose before the pipeline is lowered into the sea. The pipeline is, of course, lowered in steps for stepwise filling the inter-hose-pipe space with concrete or cement. Dry or wet concrete can be used just as was described above.

The invention is not limited to the embodiments described above but all changes and modifications thereof not constituting departures from the spirit and scope of the invention are intended to be included.

I claim:

1. Method of preparing tube or pipelines for installation on the bottom of the sea, lakes, rivers, etc., comprising:
   providing a flexible hose around the pipe or tube to be installed;
   winding at least one wire or cable around the tube, the wire or cable being provided with spacers which are being placed onto the tube for holding the wire or cable in spaced-apart relation to the tube, the cable or wire being located inside of the hose;
   filling fresh concrete in steps into a space as provided between the hose and the pipe or tube, prior to submarine installation; and
   winding cable or ropes helically around the hose subsequently to the filling step for establishing concrete cushions, but also prior to submarine installation.

2. Method as in claim 1, said winding step being carried out with a large pitch and spaced apart cable or ropes.

3. Method as in claim 1, the hose being provided with closable openings arranged along the hose, the filling step including the step of stepwise passing openings under a concrete dispensing station.

4. Method as in claim 1, said hose being water permeable, the concrete being filled in the dry state.

5. Method as in claim 1, said hose being water impermeable, the filling step being comprised of filling wet concrete, said wet concrete setting only after submarine installation.

* * * * *